United States Patent
Maletin et al.

(10) Patent No.: US 9,524,830 B2
(45) Date of Patent: Dec. 20, 2016

(54) METHOD FOR SELECTING NANOPOROUS CARBON MATERIAL FOR POLARIZABLE ELECTRODE, METHOD FOR MANUFACTURING SUCH POLARIZABLE ELECTRODES AND METHOD FOR MANUFACTURING ELECTROCHEMICAL DOUBLE LAYER CAPACITOR

(71) Applicants: Yuriy Maletin, Kiev (UA); Natalia Stryzhakova, Kiev (UA); Sergii Zelinskyi, Shumsk (UA); Denys Gromadskyi, Irpin (UA); Sergii Tychyna, Zhitomir (UA)

(72) Inventors: Yuriy Maletin, Kiev (UA); Natalia Stryzhakova, Kiev (UA); Sergii Zelinskyi, Shumsk (UA); Denys Gromadskyi, Irpin (UA); Sergii Tychyna, Zhitomir (UA)

( * ) Notice: Subject to any disclaimer, the term of this patent is extended or adjusted under 35 U.S.C. 154(b) by 543 days.

(21) Appl. No.: 13/691,786

(22) Filed: Dec. 1, 2012

(65) Prior Publication Data
US 2013/0139951 A1 Jun. 6, 2013

Related U.S. Application Data

(60) Provisional application No. 61/566,559, filed on Dec. 2, 2011.

(51) Int. Cl.
*H01G 9/00* (2006.01)
*H01G 9/042* (2006.01)
*H01G 11/24* (2013.01)
*H01G 11/42* (2013.01)
*H01G 11/60* (2013.01)
*H01G 11/62* (2013.01)

(52) U.S. Cl.
CPC .............. *H01G 9/042* (2013.01); *H01G 11/24* (2013.01); *H01G 11/42* (2013.01); *H01G 11/60* (2013.01); *H01G 11/62* (2013.01); *Y02E 60/13* (2013.01); *Y02T 10/7022* (2013.01)

(58) Field of Classification Search
None
See application file for complete search history.

(56) References Cited

U.S. PATENT DOCUMENTS

2008/0180881 A1* 7/2008 Feaver et al. ................. 361/502

* cited by examiner

*Primary Examiner* — Seahvosh Nikmanesh
(74) *Attorney, Agent, or Firm* — SciTech Legal, P.C.; Yakov M. Korkhin, Esq.

(57) ABSTRACT

A method of selecting the nanoporous carbon material for at least one of the polarizable electrodes (positive and/or negative) of EDLC with given organic electrolyte is suggested. The method includes providing of a number of nanoporous carbon materials, which can potentially be used for manufacturing the EDLC electrodes, impregnating the materials with the selected electrolyte followed by measuring the diffusion coefficients of anions and cations of the electrolyte inside the pores of the carbon materials and selecting for positive and negative electrodes the carbon materials, which provide the maximum diffusion coefficients of anions and cations, respectively. A method of manufacturing polarizable electrodes (positive and/or negative) and a method of manufacturing electrochemical double-layer capacitor based on the said method of selecting the nanoporous carbon material are also suggested.

20 Claims, 5 Drawing Sheets

ମETHOD FOR SELECTING NANOPOROUS CARBON MATERIAL FOR POLARIZABLE ELECTRODE, METHOD FOR MANUFACTURING SUCH POLARIZABLE ELECTRODES AND METHOD FOR MANUFACTURING ELECTROCHEMICAL DOUBLE LAYER CAPACITOR

CROSS REFERENCE TO RELATED APPLICATION

This application claims priority to a U.S. provisional application Ser. No. 61/566,559 entitled "Method for Selecting Nanoporous Carbon Material for Polarizable Electrode, Method for Manufacturing such Polarizable Electrodes and Method for Manufacturing Electrochemical Double Layer Capacitor", filed on Dec. 2, 2011, which is incorporated in its entirety herein by reference.

FIELD

The present teachings relate, in general, to energy storage devices, and more particularly, to electrochemical double layer capacitors (EDLC) capable of providing high energy and power densities. Such capacitors, also known as supercapacitors or ultracapacitors, have broad utility, for example in start&stop automobile systems, in hybrid and electric vehicles, in various backup systems to compensate short-term voltage surges or drops.

BACKGROUND

A typical EDLC comprises at least one electrode made of a nanoporous carbon material. The second electrode can be made either of a similar nanoporous carbon (as in so called symmetrical EDLC devices) or of a different material taken from battery technology (as in so called asymmetrical or hybrid devices.) In either case the energy density stored in a typical EDLC device is less than that stored in a typical Pb/acid or Li-ion battery. On the other hand, one of key advantages of EDLC as compared to any other type of batteries is their low internal resistance, resulting in high power density and high efficiency. Among several contributors to the total internal resistance of EDLC, the resistance of electrolyte in the porous electrode matrix is the most significant.

Therefore, when selecting nanoporous carbons for EDLC electrodes, the electrolyte mobility in the porous electrodes, in particular different mobility of anions and cations, which influences the resistance of positive and negative electrodes, respectively, should be taken into consideration.

Accordingly, there is a need for developing a method for selecting nanoporous carbon materials capable of providing high mobility of electrolyte ions in their porous matrices and, correspondingly, low internal resistance of a EDLC device utilizing the selected carbons as electrode materials.

SUMMARY

In some aspects, the present teachings provide for a method for selecting a nanoporous carbon material for a polarizable electrode of an electrochemical double-layer capacitor comprising an organic electrolyte. The method includes providing a plurality of nanoporous carbon materials, providing an electrolyte, impregnating the nanoporous carbon materials with the electrolyte, measuring the diffusion coefficients of anions and/or cations of electrolyte inside the pores of the nanoporous carbon materials, and selecting an optimal nanoporous carbon material for use in a polarizable electrode of an electrochemical double-layer capacitor. The selected optimal nanoporous carbon material provides the highest diffusion coefficient of anions and/or cations. Prior to measuring the diffusion coefficients, the method may also include pre-selecting nanoporous carbon materials comprising shallow slit-shaped pores having wide exits to meso- and macro-pores. The pre-selecting may be performed utilizing transmission electron microscopy. The electrolyte in the method may be ethyltrimethylammonium tetrafluoroborate dissolved in acetonitrile ($CH_3CN$) and/or acetonitrile-$D_3$ ($CD_3CN$). The present teachings also provide for a polarizable electrode prepared in accordance with the forgoing method, as well as for an electrochemical double-layer capacitor containing a polarizable electrode prepared in accordance with the forgoing method.

In some aspects, the present teachings provide for a method for manufacturing a polarizable electrode for an electrochemical double-layer capacitor comprising an organic electrolyte. The method includes providing a plurality of nanoporous carbon materials, impregnating the nanoporous carbon materials with an electrolyte, measuring the diffusion coefficients of anions or cations of electrolyte inside the pores of the nanoporous carbon materials, selecting an optimal nanoporous carbon material for use in a polarizable electrode of an electrochemical double-layer capacitor. The optimal nanoporous carbon material provides the highest diffusion coefficient of anions or cations. The method further includes providing a nanoporous carbon powder comprising the optimal nanoporous carbon material, preparing a mixture of the nanoporous carbon powder with a binder, and placing the mixture onto a current collector. Prior to measuring the diffusion coefficients, the method may also include pre-selecting nanoporous carbon materials comprising shallow slit-shaped pores having wide exits to meso- and macro-pores. The pre-selecting may be performed utilizing transmission electron microscopy. The method may also include doping the surface of pores of at least one nanoporous carbon material with nitrogen atoms by thermo-treating a mixture of the at least one nanoporous carbon material with a powdered triazine derivative. The doping yields a carbon material containing more than about 10 atomic % of nitrogen on its surface. The binder used in the method may be polytetrafluoroethylene. The present teachings also provide for a polarizable electrode prepared in accordance with the forgoing method, as well as for an electrochemical double-layer capacitor containing a polarizable electrode prepared in accordance with the forgoing method.

In some aspects, the present teachings provide for a method for manufacturing an electrochemical double-layer capacitor. The method includes providing a plurality of nanoporous carbon materials, impregnating the nanoporous carbon materials with an electrolyte, measuring the diffusion coefficients of anions or cations of electrolyte inside the pores of the nanoporous carbon materials, selecting an optimal nanoporous carbon material for use in a polarizable electrode of an electrochemical double-layer capacitor. The optimal nanoporous carbon material provides the highest diffusion coefficient of anions or cations. The method further includes providing an organic electrolyte and a nanoporous carbon powder comprising the optimal nanoporous carbon material, preparing a mixture of the nanoporous carbon powder with a binder, placing the mixture onto a corresponding current collector, which is connected to a current lead, resulting in a polarizable electrode, separating the polarizable electrode from another polarizable electrode with a porous insulating film ("separator"), placing the polarizable electrode separated with the separator from the another polarizable electrode into a shell, impregnating the polarizable electrodes and the separator with the organic electrolyte, and sealing the shell. Prior to measuring the diffusion coefficients, the method may also include pre-selecting nanoporous carbon materials comprising shallow slit-shaped pores having wide exits to meso- and macro-pores. The pre-selecting may be performed utilizing transmission electron microscopy. The method may also include doping the surface of pores of at least one nanoporous carbon material with nitrogen atoms by thermo-treating a mixture of the at least one nanoporous carbon material with a powdered triazine derivative. The doping yields a carbon material containing more than about 10 atomic % of nitrogen on its surface. The organic electrolyte of the method may contain tetrakis(dialkylamino)phosphonium, and/or tetra-alkylammonium tetrafluoroborates, and/or hexafluorophosphates. The organic electrolyte may further contain a polar aprotic solvent. The polar aprotic solvent may contain a nitrile, such as acetonitrile, propionitrile and/or 3-methoxy propionitrile; a lactone, such as γ-butyrolactone and/or γ-valerolactone; a carbonate, such as propylene carbonate, ethylene carbonate and/or ethyl methyl carbonate; methyl ethyl ketone; dimethoxyethane; and/or tetrahydrofurane. Total salt concentration in the organic electrolyte may be chosen in the range from about 1 mol/l to about 2 mol/l. Total salt concentration in the organic electrolyte may be about 1.3 mol/l. The method may include manufacturing a cathode and/or an anode of the electrochemical double-layer capacitor utilizing rolling a mixture of the selected carbon powders with a binder. The binder may be polytetrafluoroethylene. The present teachings also provide for an electrochemical double-layer capacitor prepared in accordance with the forgoing method.

BRIEF DESCRIPTION OF THE DRAWINGS

The present teachings are illustratively shown and described in reference to the accompanying drawings, in which.

DETAILED DESCRIPTION

In some aspects the present teachings provide for a method for selecting nanoporous carbon materials which best match a given electrolyte in order to provide high mobility of the electrolyte in the carbon porous matrix and, correspondingly, low internal resistance of a EDLC device utilizing the selected carbons as electrode materials.

In one implementation, the method provides for selecting a nanoporous carbon material for at least one of the polarizable electrodes (positive or negative) of EDLC comprising a pre-selected organic electrolyte, the method includes providing a number of nanoporous carbon materials, which can potentially be used for manufacturing the EDLC electrodes, due to their large surface area and low content of impurities, impregnating the materials with the pre-selected electrolyte, followed by measuring diffusion coefficients of anions or cations of the electrolyte inside the pores of the carbon materials and selecting the materials which provide the maximum diffusion coefficients of the electrolyte ions.

Ion mobility is the key parameter influencing the electrolyte resistance in the porous electrode matrix. In accordance with known equations (see A. J. Bard, L. R. Faulkner; Electrochemical Methods. Fundamentals and Applications (second edition); Wiley, 2001, p. 137, the contents of which is incorporated herein by reference in its entirety) the ion mobility and, correspondingly, the electrolyte conductivity are proportional to diffusion coefficients of the ions. Ion diffusion coefficients can be accurately measured utilizing pulsed field-gradient NMR spectroscopy (see Y. Cohen, L. Avram, L. Frish; Angew. Chem. Int. Ed., 2005, 44, p. 520, the contents of which is incorporated herein by reference in its entirety) or, alternatively, utilizing a rotating disc electrode in electrochemical measurements of the plot of diffusion current value versus the electrode rotation rate (see A. J. Bard, L. R. Faulkner; Electrochemical Methods. Fundamentals and Applications (second edition); Wiley, 2001, p. 335, the contents of which is incorporated herein by reference in its entirety).

Thus, in contrast to the method of selecting the electrode materials by matching their pore size with the sizes of anions and cations in the electrolyte, the present teachings enable selecting the electrode material or two different materials that provide maximum mobility of electrolyte ions in their porous matrix and, when used as electrode materials in EDLC, provide minimum contribution to the EDLC internal resistance.

In certain aspects the present teachings provide for a method for manufacturing positive or negative EDLC electrodes capable of providing minimum EDLC internal resistance by way of pre-selecting nanoporous carbon materials for positive or negative electrodes, the selection being based on the mobility of a given electrolyte ions inside the porous carbon matrix.

The latter method can, for example, be implemented as follows. Generally, a method for manufacturing a polarizable electrode for EDLC with a given organic electrolyte includes selecting a nanoporous carbon powder, mixing the selected carbon powder with a binder, placing the mixture thus obtained onto a corresponding current collector, which is connected to a corresponding current lead. The present teachings provide for introducing the following steps:

providing a number of nanoporous carbon powders, which can potentially be used to prepare said polarizable electrodes;

impregnating the powders with the electrolyte;

measuring the diffusion coefficients of anions and/or cations of the electrolyte inside the carbon pores followed by selecting the nanoporous carbon powder which provides the maximum diffusion coefficients of the electrolyte anions and/or cations in the carbon porous matrix.

Thus selected nanoporous carbon powder is subsequently used in manufacturing of positive and/or negative electrodes.

Implementation of the present teachings results in the following effect: an EDLC device, which comprises the electrodes made of thus selected nanoporous carbon materials, demonstrates lower internal resistance. The causal link between the implemented improvements and technical effects is supported in the foregoing description of the method of selecting carbon powders that provide maximum mobility of electrolyte ions in their porous matrices.

In some aspects the methods of the present teachings, and their equivalents, may include, prior to measuring the diffusion coefficients, examining the carbon powders utilizing transmission electron microscopy (TEM) followed by selecting the carbons with preferably shallow slit-shaped pores having wide exits to meso- and macro-pores. Our experiments have shown that such carbons can provide the highest diffusion coefficients of organic electrolytes in their porous matrices resulting in low internal resistance of a corresponding EDLC device.

European patent application S/N EP11166818, filed on May 19, 2011 (the contents of which is incorporated herein by reference in its entirety) discloses a method for doping the surface of a nanoporous carbon material with nitrogen atoms. The carbon material thus modified, if later used as an electrode material in an EDLC, provides a reduction of EDLC internal resistance. It is further disclosed herein that the diffusion coefficient of the electrolyte inside the carbon material's porous matrix increases due to the doping of the carbon surface with the nitrogen atoms. Thus, the present teachings also anticipate that the methods disclosed herein, and their equivalents, may include doping the surface of the pores of at least one of the nanoporous carbon materials with nitrogen atoms, for example by thermo-treating a mixture of the nanoporous carbon powder with a powdered triazine derivative, yielding a carbon material containing more than 10 atomic % of nitrogen on its surface.

In some aspects the present teachings provide for a method for manufacturing an EDLC, the method provides for a low internal resistance of the EDLC due to selecting a nanoporous carbon material for the EDLC's positive and/or negative polarizable electrodes using as a criterion the electro-physical interactions of the carbon material porous matrix with ions of a chosen electrolyte.

The latter method can, for example, be implemented as follows. Generally, a method for manufacturing of EDLC devices, wherein an organic electrolyte and a nanoporous carbon powder are used, comprises preparing a mixture of the carbon powder with a binder, the mixture is then placed onto corresponding current collectors, which are connected to corresponding current leads, resulting in positive and negative electrodes, the positive and negative electrodes are interleaved with a porous insulating film (separator), the electrodes with separator are placed in a shell and impregnated with the electrolyte followed by sealing the shell. The present teachings provide for introducing the following steps:

providing a number of nanoporous carbon powders, which can potentially be used to prepare said polarizable electrodes;
impregnating each carbon powder with the electrolyte;
measuring the diffusion coefficients of anions and cations of the electrolyte inside the pores of the carbon powders;
selecting a nanoporous carbon powder or two different powders which provide the maximum diffusion coefficients of the electrolyte anions and cations in the carbon porous matrices, and then
manufacturing positive and negative electrodes comprising the carbon material, or two different carbon materials, which demonstrate the maximum diffusion coefficients of anions and cations, respectively.

As disclosed in the foregoing, these improvements enable reducing the internal resistance of an EDLC due to the selection of electrode materials with maximum mobility of the electrolyte in the electrode porous matrices. The mobility, in turn, is proportional to the measured diffusion coefficients of the ions.

Since some nanoporous carbons cannot be used in NMR measurements because of a very short correlation times of the electrolyte in their pores resulting in unreliable diffusion coefficient evaluations, the present teachings provide for an independent method of measuring the diffusion coefficients of ions in carbon nanopores, namely, a variant of a well-known Rotating Disc Electrode (RDE) method (see A. J. Bard, L. R. Faulkner; Electrochemical Methods. Fundamentals and Applications (second edition); Wiley, 2001, p. 335, the contents of which is incorporated herein by reference in its entirety) but utilizing a disc electrode (BASi RDE-1) covered with a nanoporous carbon. As a reversible redox-pair for cyclic voltammetry measurements, the ferrocene-ferrocenium cation ($Fc/Fc^+$) pair is utilized, since the $Fc^+$ cation is close in its size and insignificant solvation effects to typical $R_4N^+$ cations used in EDLC technology. As can be seen in FIG. 3, there is a remarkable correlation between internal resistance of a EDLC device and $Fc^+$ diffusion coefficient in the pores of the corresponding carbon electrode material. Absolute values of diffusion coefficients of $EtMe_3N^+$ and $Fc^+$ cations, though measured by different methods, are close—cf. FIGS. 2 and 3. It is also worth noting that the diffusion coefficient of $Fc^+$ cations, when measured with the use of a flat graphite electrode, is $10.1 \times 10^{-10}$ m$^2$/s, which value significantly exceeds the values in carbon nanopores presented in FIG. 3 and reflects strong interactions of ions with pore walls.

As disclosed in the foregoing, the latter procedure may be further elaborated by including the following steps:
before measuring the diffusion coefficients, studying the carbon powders utilizing TEM followed by selecting the carbons with preferably shallow slit-shaped pores having wide exits to meso- and macro-pores; and/or including the following steps:
doping the surface of the pores of at least one of the nanoporous carbon materials with nitrogen atoms, for example by thermo-treating a mixture of the nanoporous carbon powder with a powdered triazine derivative, yielding a carbon material containing more than about 10 atomic % of nitrogen on its surface.

The present teachings are illustrated in more detail through Examples below. It should be understood, however, that the present teaching are not limited to the embodiments disclosed in the Examples but may as well be embodied in other processes, forms and devices without departing from the scope and spirit of the present teachings.

Example 1

The following nanoporous carbon powders were taken for the study disclosed herein:
ZL-302 (HUZHOU SENSHENG ACTIVATED CARBON CO., Ltd)
NY1151 (Kuraray Chemical Co., Ltd)
YP80F (Kuraray Chemical Co., Ltd)

NC2-1E (EnerG2 Technologies Inc.)
P2-15 (EnerG2 Technologies Inc.)
Haycarb HDLC 20B STUW (Haycarb PLC)
Y-Carbon (Y-Carbon Inc.)
ZL-302 carbon powder thermally treated with melamine and containing 15.2 atomic % of nitrogen on its surface (the nitrogen concentration was measured with utilizing X-ray photoelectron spectroscopy, KRATOS-800× PS, energy resolution of 1.2 eV, $K_\alpha$ (Al), hv=1486.6 eV, spectral data treated with the help of XPSPeak 4.0).

The carbon powders were impregnated with ethyltrimethylammonium tetrafluoroborate (ETMA $BF_4$) dissolved in either acetonitrile ($CH_3CN$) or acetonitrile-$D_3$ ($CD_3CN$) followed by placing each powder into a special cuvette of a NMR spectrometer.

Diffusion coefficients of ETMA cations and $BF_4$ anions in the porous carbons were measured utilizing pulsed field-gradient spin echo NMR technique (see Y. Cohen, L. Avram, L. Frish. Angew; Chem. Int. Ed., 2005, 44, 520-554, the contents of which is incorporated herein by reference in its entirety) using a Bruker Avance 400 NMR spectrometer equipped with a special attachment for field-gradient measurements. The obtained values of diffusion coefficients fell into two main groups—fast and slow, thus reflecting, essentially, different mobilities of the electrolyte in wide or narrow pores, respectively. To select the electrode material, predominantly the fast component was taken into consideration, since it was found that the fast diffusion coefficients best correlate with internal resistance of EDLC devices.

Figure 1:
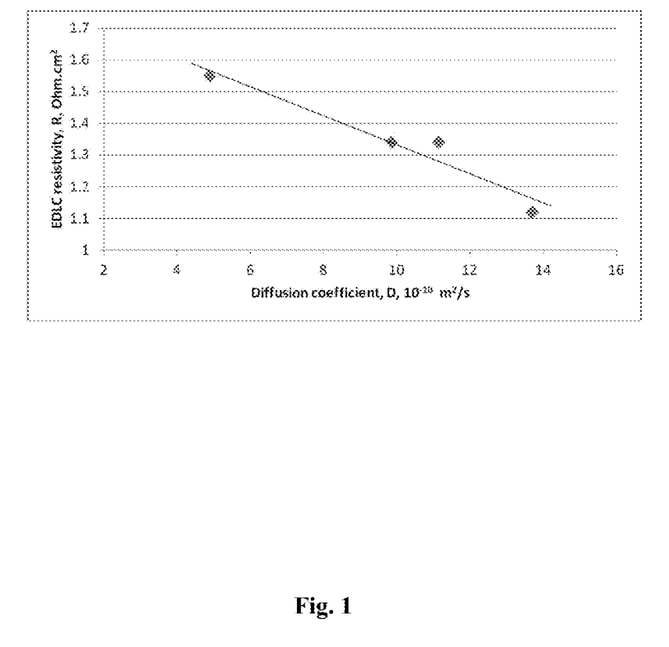
FIG. 1 illustrates a plot of resistivity of EDLC prototypes fabricated of various nanoporous carbon materials as electrodes versus the diffusion coefficient of $BF_4^-$ anions in these materials.
Figure 2:
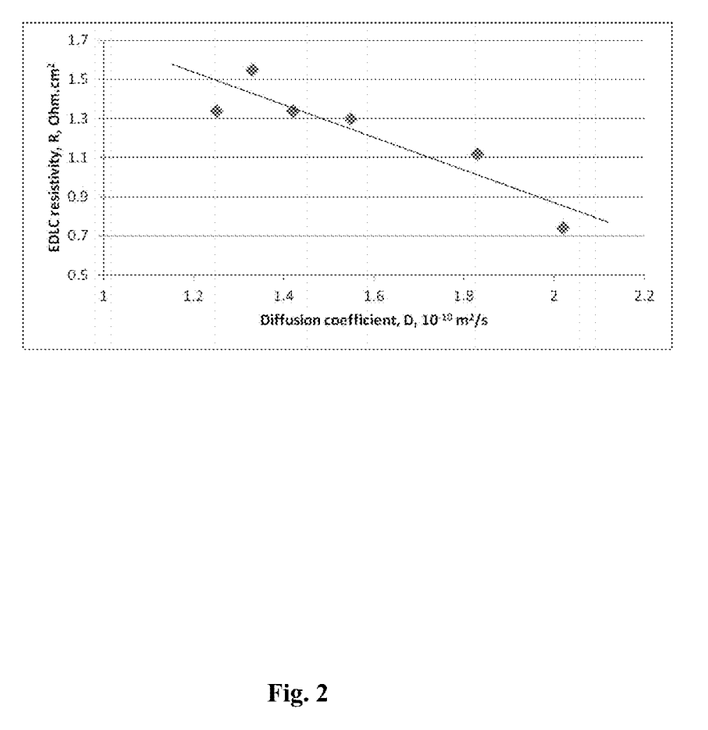
FIG. 2 illustrates a plot of resistivity of EDLC prototypes fabricated of various nanoporous carbon materials as electrodes versus the diffusion coefficient of ethyl trimethyl ammonium (ETMA) cations in these materials.
Figure 3:
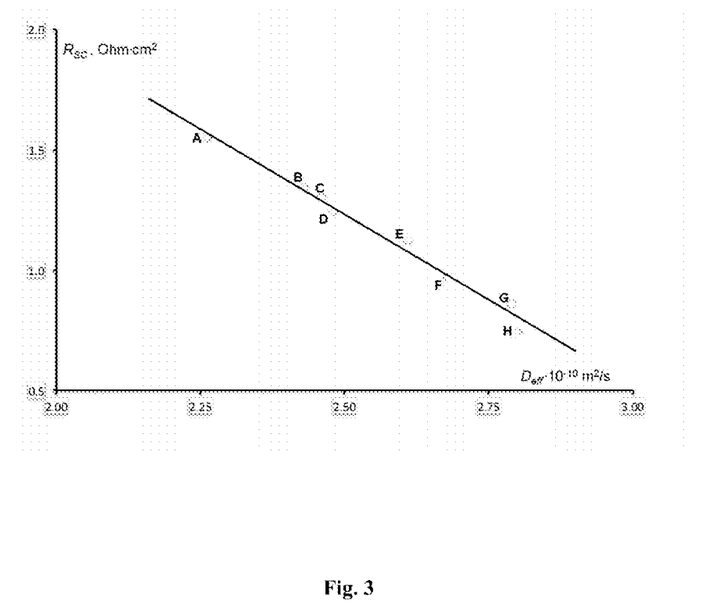
FIG. 3 illustrates a plot of resistivity of EDLC prototypes fabricated of various nanoporous carbon materials as electrodes versus the diffusion coefficient of ferrocenium ($Fc^+$) cations in these materials.

The results of the measurements are illustrated in FIG. 1 and FIG. 2, wherein the diffusion coefficients of electrolyte anions and cations in various carbon materials listed above are plotted versus resistivities of EDLC prototypes comprising these materials as electrodes. The EDLC prototypes included two electrodes (positive and negative) made of the same porous carbon, applied on corresponding current collectors and interleaved with a porous insulating film (separator). Carbon electrodes and the separator were impregnated with 1.3M ETMA $BF_4$ in acetonitrile (electrolyte) and hermetically sealed in a shell made of aluminum foil laminated with polypropylene. Internal resistances of thus fabricated EDLC prototypes were measured from potential jump/drop when charging/discharging a prototype with a constant current value, in accordance with the IEC 62391-1 International Standard.

From the plots presented in FIG. 1 and FIG. 2 it is apparent that an increase in diffusion coefficients of anions and cations inside porous matrices of the carbon materials, which were selected for this example, correlates with a decrease in internal resistance of the EDLC prototypes, when these carbon materials were used for manufacturing their polarizable electrodes.

Example 2

Figure 4A:
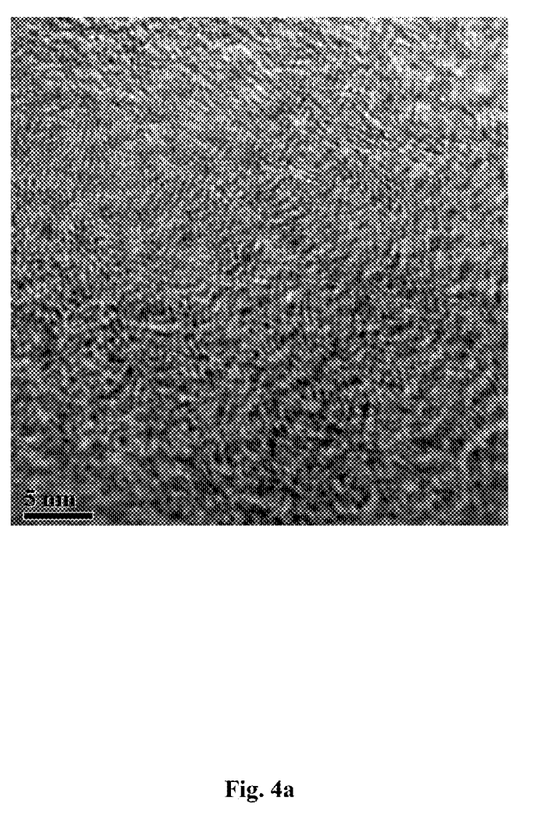
FIG. 4a shows transmission electron microscopy (TEM) images of sections of nanoporous Haycarb HDLC 20B STUW carbon powder.
Figure 4B:
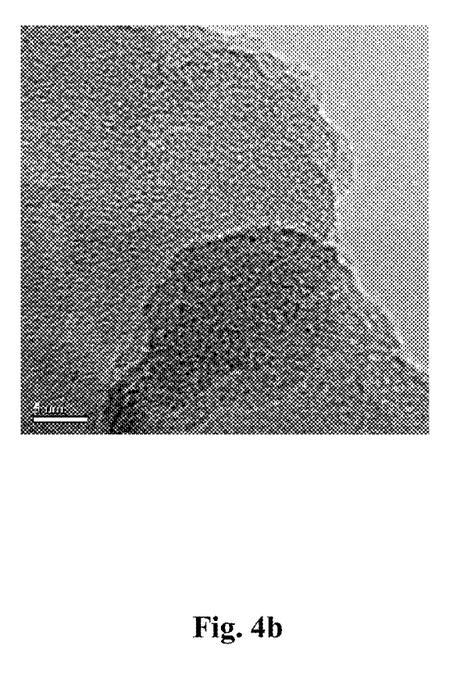
FIG. 4b shows TEM images of sections of nanoporous YP80F carbon powder.

The porous matrices of carbon materials were studied utilizing transmission electron microscopy (TEM) using a Jeol JEM-2100F instrument. Darkened spots on TEM pictures—see, e.g., FIG. 4a and FIG. 4b—correspond to regions with thick carbon layers and high electron densities, essentially where the electron beam is scattering. A sharp change from a lightened to a darkened region is treated as a boundary, where two carbon clusters are superposed such that the electron beam has to travel through their total thickness.

According to the TEM data, the defects or "pores" look like shear-crack deformations of graphene layers, which phenomenon is also known as slit-shaped porosity (e.g., see T. Ohba, K. Kaneko; Initial Filling Mechanism of Predominant Water Adsorption on Hydrophobic Slit-Shaped Carbon Nanopores//Journal of Physics: Conference Series 177 (2009) 012001, the contents of which is incorporated herein by reference in its entirety). Slit size varies within a few nanometers, according to the TEM data.

In the course of experimentation it was revealed that the diffusion coefficients of the electrolyte in ZL-302 and Y-Carbon materials were among the lowest and, accordingly, it was also revealed that the resistances of the EDLC prototypes having electrodes made of those carbons were among the highest. On the other hand, Haycarb, P2-15 or YP80F carbons, which provide low resistance when used in EDLC prototypes, demonstrated high diffusion coefficients and exhibited clearly observed "shear-cracks" of graphene layers or "slits", as is apparent from FIGS. 4a and 4b.

It was also apparent that it is preferable to use an electrolyte that is based on tetrakis(dialkylamino)phosphonium, and/or tetra-alkylammonium tetrafluoroborates, and/or hexafluorophosphates, or a mixture thereof, dissolved in a polar aprotic solvent, or in a mixture of such solvents, selected from nitriles (for example, acetonitrile, propionitrile, 3-methoxy propionitrile), lactones (for example, γ-butyrolactone, or γ-valerolactone), carbonates (for example, propylene carbonate, ethylene carbonate, or ethyl methyl carbonate), methyl ethyl ketone, dimethoxyethane, or tetrahydrofurane. These electrolytes are stable, both chemically and electrochemically, and maintain their performance in a wide temperature range. The electrolyte total salt concentration is usually chosen in the range from about 1 mol/l to about 2 mol/l, and preferably about 1.3 mol/1.

Thus, the general scheme of the present teachings, which provide for an EDLC of low internal resistance, can be described as follows:

providing a number of nanoporous carbon powders, which can potentially be used to prepare polarizable electrodes for an EDLC due to their large surface area and low content of impurities;

studying the carbon powders utilizing TEM, followed by selecting the carbons with preferably shallow slit-shaped pores having wide exits to meso- and macro-pores;

impregnated each pre-selected carbon powder with an electrolyte;

measuring the diffusion coefficients of anions and cations of the electrolyte inside the pores of the selected carbon powders;

selecting a nanoporous carbon powder which provides maximum diffusion coefficient of the electrolyte cations in its carbon porous matrix for manufacturing a negative electrode of the EDLC;

selecting a nanoporous carbon powder providing maximum diffusion coefficient of the electrolyte anions in its carbon porous matrix for manufacturing a positive electrode of the EDLC;

manufacturing the EDLC cathode(s) and anode(s), e.g. utilizing rolling a mixture of the selected corresponding cathodic or anodic carbon powders with a binder (e.g. polytetrafluoroethylene (PTFE) binder);

assembling a pack of electrodes, wherein positive and negative electrodes are positioned opposite each other and are interleaved with a porous insulating film (separator);

placing the electrode pack, comprising at least one negative electrode, at least one positive electrode, and at least one separator in between, in a shell and impregnating the pack with the electrolyte followed by sealing the EDLC shell.

It should be clearly understood that in addition to providing the foregoing methods, the present teachings also provide for device prepared in accordance with the foregoing methods. E.g. the present teachings provide for a polarizable electrode prepared in accordance with any method for manufacturing polarizable electrode taught in the foregoing disclosure, as well as for a EDCL manufactured in accordance with any method for manufacturing an electrochemical double-layer capacitor taught in the foregoing disclosure.

INCORPORATION BY REFERENCE

The references cited herein throughout, to the extent that they provide exemplary procedural or other details supplementary to those set forth herein, are all specifically incorporated herein by reference.

All of the patents and publications cited herein are hereby incorporated by reference.

Each of the applications and patents cited in this text, as well as each document or reference cited in each of the applications and patents (including during the prosecution of each issued patent; "application cited documents"), and each of the PCT and foreign applications or patents corresponding to and/or paragraphing priority from any of these applications and patents, and each of the documents cited or referenced in each of the application cited documents, are hereby expressly incorporated herein by reference. More generally, documents or references are cited in this text, either in a Reference List, or in the text itself; and, each of these documents or references ("herein-cited references"), as well as each document or reference cited in each of the herein-cited references (including any manufacturer's specifications, instructions, etc.), is hereby expressly incorporated herein by reference.

EQUIVALENTS

Those skilled in the art can appreciate from the foregoing disclosure that the present teachings can be implemented in a variety of forms and ways. Therefore, while these teachings have been described in connection with particular embodiments and examples thereof, the true scope of the present teachings should not be so limited. Various changes and modifications may be made without departing from the scope and the spirit of the present teachings. Those skilled in the art will recognize, or be able to ascertain using no more than routine experimentation, many equivalents to the specific embodiments of the invention described herein. Such equivalents are intended to be encompassed by the following claims.

What is claimed is:

1. A method for selecting a nanoporous carbon material for a polarizable electrode of an electrochemical double-layer capacitor comprising an organic electrolyte, the method comprising:
providing a plurality of nanoporous carbon materials;
providing an electrolyte;
impregnating said nanoporous carbon materials with the electrolyte;
measuring the diffusion coefficients of anions or cations of the electrolyte inside the pores of said nanoporous carbon materials; and
selecting an optimal nanoporous carbon material for use in a polarizable electrode of an electrochemical double-layer capacitor, wherein said optimal nanoporous carbon material provides the highest diffusion coefficient of the anions or the cations.

2. The method of claim 1, further comprising, prior to said measuring the diffusion coefficients, pre-selecting nanoporous carbon materials comprising shallow slit-shaped pores having wide exits to meso- and macro-pores.

3. The method of claim 2, wherein said pre-selecting is performed utilizing transmission electron microscopy.

4. The method of claim 1, wherein said electrolyte is ethyltrimethylammonium tetrafluoroborate dissolved in acetonitrile ($CH_3CN$) or acetonitrile-$D_3$ ($CD_3CN$).

5. A method for manufacturing a polarizable electrode for an electrochemical double-layer capacitor comprising an organic electrolyte, the method comprising:
providing a plurality of nanoporous carbon materials;
impregnating said nanoporous carbon materials with an electrolyte;
measuring the diffusion coefficients of anions or cations of the electrolyte inside the pores of said nanoporous carbon materials;
selecting an optimal nanoporous carbon material for use in a polarizable electrode of an electrochemical double-layer capacitor, wherein said optimal nanoporous carbon material provides the highest diffusion coefficient of the anions or the cations;
providing a nanoporous carbon powder comprising said optimal nanoporous carbon material;
preparing a mixture of the nanoporous carbon powder with a binder; and
placing said mixture onto a current collector.

6. The method of claim 5, further comprising, prior to said measuring the diffusion coefficients, pre-selecting nanoporous carbon materials comprising shallow slit-shaped pores having wide exits to meso- and macro-pores.

7. The method of claim 6, wherein said pre-selecting is performed utilizing transmission electron microscopy.

8. The method of claim 5, further comprising doping the surface of pores of at least one nanoporous carbon material with nitrogen atoms by thermo-treating a mixture of said at least one nanoporous carbon material with a powdered triazine derivative, wherein said doping yields a carbon material containing more than about 10 atomic % of nitrogen on its surface.

9. The method of claim 5, wherein said binder is polytetrafluoroethylene.

10. A method for manufacturing an electrochemical double-layer capacitor, said method comprising:
providing a plurality of nanoporous carbon materials;
impregnating said nanoporous carbon materials with an electrolyte;
measuring the diffusion coefficients of anions or cations of the electrolyte inside the pores of said nanoporous carbon materials;
selecting an optimal nanoporous carbon material for use in a polarizable electrode of an electrochemical double-layer capacitor, wherein said optimal nanoporous carbon material provides the highest diffusion coefficient of the anions or the cations;
providing an organic electrolyte and a nanoporous carbon powder comprising said optimal nanoporous carbon material;
preparing a mixture of the nanoporous carbon powder with a binder;
placing said mixture onto a corresponding current collector which is connected to a current lead, resulting in a polarizable electrode;
separating said polarizable electrode from another polarizable electrode with a porous insulating film;
placing said polarizable electrode separated with said porous insulating film from said another polarizable electrode into a shell;

impregnating said polarizable electrode with said organic electrolyte; and sealing said shell.

11. The method of claim 10, further comprising, prior to said measuring the diffusion coefficients, pre-selecting nanoporous carbon materials comprising shallow slit-shaped pores having wide exits to meso- and macro-pores.

12. The method of claim 10, wherein said pre-selecting is performed utilizing transmission electron microscopy.

13. The method of claim 10, further comprising doping the surface of pores of at least one nanoporous carbon material with nitrogen atoms by thermo-treating a mixture of said at least one nanoporous carbon material with a powdered triazine derivative, wherein said doping yields a carbon material containing more than about 10 atomic % of nitrogen on its surface.

14. The method of claim 10, wherein said organic electrolyte comprises an electrolyte selected from the group consisting of:

tetrakis(dialkylamino)phosphonium;

tetra-alkylammonium tetrafluoroborates; and hexafluorophosphates.

15. The method of claim 10, wherein said organic electrolyte comprises a polar aprotic solvent.

16. The method of claim 15, wherein said polar aprotic solvent is selected from the group consisting of:

a nitrile, such as acetonitrile, propionitrile or 3-methoxy propionitrile;

a lactone, such as γ-butyrolactone or γ-valerolactone;

a carbonate, such as propylene carbonate, ethylene carbonate or ethyl methyl carbonate;

methyl ethyl ketone;

dimethoxyethane; and tetrahydrofurane.

17. The method of claim 10, wherein total salt concentration in said organic electrolyte is chosen in the range from about 1 mol/l to about 2 mol/1.

18. The method of claim 10, wherein total salt concentration in said organic electrolyte is about 1.3 mol/1.

19. The method of claim 10, further comprising manufacturing a cathode or an anode of said electrochemical double-layer capacitor utilizing rolling a mixture of the selected carbon powders with a binder.

20. The method of claim 19, wherein said binder is polytetrafluoroethylene.

* * * * *